United States Patent
Wei et al.

(10) Patent No.: US 11,845,445 B2
(45) Date of Patent: Dec. 19, 2023

(54) VEHICLE ROLLOVER PREVENTION WARNING METHOD, DEVICE, STORAGE MEDIUM, AND VEHICLE

(71) Applicants: GREE ELECTRIC APPLIANCES (WUHAN) CO., LTD, Hubei (CN); GREE ELECTRIC APPLIANCES, INC. OF ZHUHAI, Qianshan Zhuhai (CN)

(72) Inventors: Heng Wei, Qianshan Zhuhai (CN); Youlin Zhang, Qianshan Zhuhai (CN); Ai Song, Qianshan Zhuhai (CN); Haisong Cheng, Qianshan Zhuhai (CN)

(73) Assignees: GREE ELECTRIC APPLIANCES (WUHAN) CO., LTD, Hubei (CN); GREE ELECTRIC APPLIANCES, INC. OF ZHUHAI, Qianshan Zhuhai (CN)

( * ) Notice: Subject to any disclaimer, the term of this patent is extended or adjusted under 35 U.S.C. 154(b) by 484 days.

(21) Appl. No.: 16/646,227

(22) PCT Filed: Aug. 17, 2018

(86) PCT No.: PCT/CN2018/100949
§ 371 (c)(1),
(2) Date: Mar. 11, 2020

(87) PCT Pub. No.: WO2019/091176
PCT Pub. Date: May 16, 2019

(65) Prior Publication Data
US 2020/0269854 A1    Aug. 27, 2020

(30) Foreign Application Priority Data
Nov. 9, 2017    (CN) .......................... 201711096800.8

(51) Int. Cl.
*B60W 40/112*    (2012.01)
*B60K 35/00*    (2006.01)
(Continued)

(52) U.S. Cl.
CPC .......... *B60W 40/112* (2013.01); *B60K 35/00* (2013.01); *B60Q 9/008* (2013.01); *B60W 40/13* (2013.01);
(Continued)

(58) Field of Classification Search
CPC ............ B60K 2370/00; B60K 2370/15; B60K 2370/152; B60K 2370/157;
(Continued)

(56) References Cited

U.S. PATENT DOCUMENTS 5,825,284 A * 10/1998 Dunwoody ........... G01M 1/122
340/440
2008/0272899 A1    11/2008 Penzotti
2015/0353150 A1    12/2015 Ursich et al.

FOREIGN PATENT DOCUMENTS

CN    103213582 A    7/2013
CN    106427957 A    2/2017
(Continued)

OTHER PUBLICATIONS

International Search Report dated Oct. 26, 2018 in corresponding International Application No. PCT/CN2018/100949; 5 pages.
(Continued)

*Primary Examiner* — Charles J Han
(74) *Attorney, Agent, or Firm* — Maier & Maier, PLLC

(57) ABSTRACT

A method, a device, a storage medium and a vehicle for vehicle rollover prevention warning, wherein the method for vehicle rollover prevention warning includes: collecting vehicle body rollover state parameters; calculating a lateral-load transfer rate of the vehicle according to the collected
(Continued)

vehicle body rollover state parameters and a preset load transfer rate threshold model comprising the centrifugal force rollover moment of the sprung mass; and determining whether the vehicle has the risk of rollover or not according to the calculated lateral-load transfer rate and the preset rollover threshold. According to the technical solution provided by the invention, the load transfer rate threshold model based on the centrifugal force rollover moment of the sprung mass can simulate the actual rollover state of a vehicle more truly, with a more accurate state indication effect and a high warning accuracy.

15 Claims, 3 Drawing Sheets

(51) Int. Cl.
  *B60Q 9/00*  (2006.01)
  *B60W 40/13*  (2012.01)
  *G07C 5/08*  (2006.01)
  *B60W 50/14*  (2020.01)
(52) U.S. Cl.
  CPC .......... *B60W 50/14* (2013.01); *G07C 5/0825* (2013.01); *G07C 5/0833* (2013.01); *B60K 2370/152* (2019.05); *B60K 2370/1575* (2019.05); *B60K 2370/167* (2019.05); *B60K 2370/178* (2019.05); *B60W 2050/143* (2013.01); *B60W 2050/146* (2013.01); *B60W 2300/10* (2013.01); *B60W 2300/12* (2013.01); *B60W 2510/222* (2013.01); *B60W 2520/18* (2013.01); *B60W 2530/10* (2013.01)
(58) Field of Classification Search
  CPC ........ B60K 2370/1575; B60K 2370/16; B60K 2370/167; B60K 2370/178; B60K 35/00; B60Q 9/00; B60Q 9/008; B60W 2030/043; B60W 2050/0001; B60W 2050/0019; B60W 2050/0028; B60W 2050/0031; B60W 2050/143; B60W 2050/146; B60W 2300/00; B60W 30/00; B60W 30/02; B60W 30/04; B60W 40/00; B60W 40/10; B60W 40/112; B60W 40/12; B60W 40/13; B60W 50/00; B60W 50/08; B60W 50/14; G07C 5/00; G07C 5/08; G07C 5/0808; G07C 5/0816; G07C 5/0825

See application file for complete search history.

(56) References Cited

FOREIGN PATENT DOCUMENTS

| CN | 106585625 | A | * | 4/2017 | | |
|----|-----------|---|---|--------|---|---|
| CN | 106585625 | A |   | 4/2017 | | |
| CN | 106945670 | A |   | 7/2017 | | |
| CN | 107161207 | A |   | 9/2017 | | |
| CN | 107176216 | A |   | 9/2017 | | |
| CN | 107195025 | A |   | 9/2017 | | |
| CN | 108099919 | A |   | 6/2018 | | |
| CN | 106945670 | B | * | 4/2019 | ............ | B60W 40/10 |
| EP | 0942839 | A1 |   | 9/1999 | | |
| JP | 2001507648 | A |   | 6/2001 | | |
| JP | 2013-023018 | A |   | 2/2013 | | |
| KR | 20000057486 | A |   | 9/2000 | | |

OTHER PUBLICATIONS

Heng et al., "Improved Design of Generalized Dynamic Rollover Threshold of Multi-Axial Vehicle"; 2017 9th International Conference on Measuring Technology and Mechatronics Automation; 2017; pp. 23-28.

Office Action dated Sep. 12, 2022, in corresponding European Application No. 18 875 659.7; 4 pages.

Office Action dated Sep. 6, 2022, in corresponding Japanese Application No. 2020-503687; 8 pages.

Office Action dated Feb. 1, 2023, in corresponding Korean Application No. 10-2020-7005330; 13 pages.

* cited by examiner

VEHICLE ROLLOVER PREVENTION WARNING METHOD, DEVICE, STORAGE MEDIUM, AND VEHICLE

The present application claims priority to Chinese Patent Application No. 201711096800.8, entitled "Vehicle Rollover Prevention Warning Method, Device, Storage Medium, and Vehicle", filed with the Chinese Patent Office on Nov. 9, 2017, which is incorporated herein by reference in its entirety.

TECHNICAL FIELD

The invention relates to the field of intelligent automobiles, in particular to a vehicle rollover prevention warning, a device, a storage medium and a vehicle.

BACKGROUND ART

Vehicle rollover is a serious traffic accident and more likely to happen to buses and trucks due to their high centers of mass. More multi-axle buses and trucks are now on the road because of increasing demands for load capacity. When a vehicle is turning and changing lanes during high-speed driving, rollover is more likely to happen.

It is necessary to study the rollover threshold or rollover index to address the rollover problem. The prior art mainly uses three rollover thresholds including roll angle, lateral acceleration and lateral-load transfer rate (LTR) as the basis for studying the rollover problem. The rollover index is used to indicate whether the vehicle rollover occurs or not, and determination of the rollover index has a direct influence on the vehicle rollover warning algorithm.

The warning solution employing roll angle, lateral acceleration and load transfer rate as indicators and rollover thresholds conventionally uses LTR (Lateral-load Transfer Rate, LTR=(FL−FR)/(FL+FR), i.e., the difference between the vertical loads of the left and right tires of the vehicle divided by the sum of the vertical loads) as the rollover threshold, because of errors in measurement of roll angle and lateral acceleration as well as diversified thresholds of different types of vehicles.

In the prior art, a warning is given on the basis of the thresholds of a dynamic model (LTR=−2(k Φ+c Φ')/mgT) and a derivative model thereof, with the centrifugal force rollover moment of the sprung mass neglected, as a result, the calculated load transfer rate is lower than the actual value, leading to a deviation from the actual rollover state of a vehicle and inaccuracy of warning.

SUMMARY OF THE INVENTION

It's a major object of the invention to overcome the defects of the prior art by providing a method, a device, a storage medium and a vehicle for vehicle rollover prevention warning, so as to solve the problem in the prior art that the accuracy of warning is influenced due to the neglected centrifugal force rollover moment of the sprung mass.

The invention provides a method for vehicle rollover prevention warning, comprising: collecting vehicle body rollover state parameters; calculating a lateral-load transfer rate of the vehicle according to the collected vehicle body rollover state parameters and a preset load transfer rate threshold model comprising a centrifugal force rollover moment of a sprung mass; and determining whether the vehicle has a risk of rollover or not according to the calculated lateral-load transfer rate and the preset rollover threshold.

Optionally, the vehicle body rollover state parameters comprise a vehicle body roll angle and a roll angle rate.

Optionally, the method further comprises: the load transfer rate threshold model being established according to a lateral force balance relation and a rollover moment balance relation of the vehicle.

Optionally, the method further comprises: the lateral force balance relation and the rollover moment balance relation being those of a multi-axle vehicle comprising more than two axles.

Optionally, a model formula of the load transfer rate threshold model is as follows:

$$LTR_g = \frac{-2\sum_{j=1}^{n}\left(K_{\phi,j}\phi h_s + C_{\phi,j}\dot\phi h_s + \frac{h_{u,j}}{l_j \sum_{i=1}^{n}\frac{1}{l_i}}(k\phi + c\dot\phi - m_s g h_s \phi)\right)}{m_s g h_s T},$$

wherein $LTR_g$ is the lateral-load transfer rate of an n-axle vehicle; n is the number of axles of the vehicle; $m_s$ is the sprung mass of the vehicle; $h_s$ is the vertical distance from the center of mass of the vehicle to the rollover axle; $h_u = h_{uj}$ is the distance from the rollover center of each axle to the ground; T is the wheel tread of each axle; $\phi$ is the rollover angle of the vehicle; $K_{\phi,j}$,k is the roll stiffness for each axle suspension and a combined roll stiffness; $C_{\phi,j}$,c is the damping coefficient for each axle suspension and a combined damping coefficient; $l_i$=(i=1, ..., n) is the longitudinal distance of each axle from the center of mass.

Optionally, the method further comprises: a simplified form of the model formula of the load transfer rate threshold model according to the D'Alembert's principle as follows:

$$LTR_g = -\frac{2\left((k(h_u + h_s) - m_s g h_s h_u)\phi + c(h_u + h_s)\dot\phi\right)}{mgh_s T},$$

under the condition that the magnitude relation between the sprung mass $m_s$ and the unsprung mass $m_u$ of the vehicle is $m_s \gg m_u$, and the rollover centers of all the axles are the same distanced from the ground, wherein $m = m_s + m_u$; $m_u$ is the unsprung mass of the vehicle.

Optionally, determining whether the vehicle has a risk of rollover according to the calculated lateral-load transfer rate and the preset rollover threshold comprises: determining that the vehicle has no risk of rollover if the absolute value of the calculated lateral-load transfer rate is less than or equal to the preset rollover threshold; and determining that the vehicle has a risk of rollover if the absolute value of the calculated lateral-load transfer rate is larger than the preset rollover threshold.

Optionally, in the case where it is determined that the vehicle has a risk of rollover, the risk level is categorized according to the magnitude of the absolute value of the lateral-load transfer rate, where a greater absolute value of the lateral-load transfer rate indicates a higher risk of rollover.

Optionally, the method further comprises: providing the rollover warning information by displaying through a display device, broadcasting through a voice device and/or indicating through an instrument, wherein the rollover warning information comprises the lateral-load transfer rate and/or the risk level; and/or the risk level is indicated by an indicator lamp.

In another aspect of the present invention, a device for vehicle rollover prevention warning is also provided, comprising: a collecting module for acquiring vehicle body rollover state parameters; a processing module for calculating a lateral-load transfer rate of the vehicle according to the collected vehicle body rollover state parameters and a preset load transfer rate threshold model comprising a centrifugal force rollover moment of a sprung mass; and a determining module for determining whether the vehicle has a risk of rollover or not according to the calculated lateral-load transfer rate and the preset rollover threshold.

Optionally, the vehicle body rollover state parameters comprise a vehicle body roll angle and a roll angle rate.

Optionally, the device further comprises: the load transfer rate threshold model being established according to a lateral force balance relation and a rollover moment balance relation of the vehicle.

Optionally, the device further comprises: the lateral force balance relation and the rollover moment balance relation being those of a multi-axle vehicle comprising more than two axles.

Optionally, a model formula of the load transfer rate threshold model is as follows:

$$LTR_g = \frac{-2\sum_{j=1}^{n}\left(K_{\phi,j}\phi h_s + C_{\phi,j}\dot\phi h_s + \frac{h_{uj}}{l_j\sum_{i=1}^{n}\frac{1}{l_i}}\left(k\phi + c\dot\phi - m_s g h_s \phi\right)\right)}{m_s h_s T},$$

wherein $LTR_g$ is the lateral-load transfer rate of an n-axle vehicle; n is the number of axles of the vehicle; $m_s$ is the sprung mass of the vehicle; $h_s$ is the vertical distance from the center of mass of the vehicle to the rollover axle; $h_u = h_{uj}$ is the distance from the rollover center of each axle to the ground; T is the wheel tread of each axle; $\phi$ is the rollover angle of the vehicle; $K_{\phi,j}$, k is the roll stiffness for each axle suspension and a combined roll stiffness; $C_{\phi,j}$, c is the damping coefficient for each axle suspension and a combined damping coefficient; $l_i$ = (i=1, ..., n) is the longitudinal distance of each axle from the center of mass.

Optionally, the device further comprises: a simplified form of the model formula of the load transfer rate threshold model according to the D'Alembert's principle as follows:

$$LTR_g = -\frac{2\left((k(h_u+h_s)-m_s g h_s h_u)\phi + c(h_u+h_s)\dot\phi\right)}{mgh_s T},$$

under the condition that the magnitude relation between the sprung mass $m_s$ and the unsprung mass $m_u$ of the vehicle is $m_s \gg m_u$, and the rollover centers of all the axles are the same distanced from the ground, wherein $m=m_s+m_u$; $m_u$ is the unsprung mass of the vehicle.

Optionally, the determining module is also used for: determining that the vehicle has no risk of rollover if the absolute value of the calculated lateral-load transfer rate is less than or equal to the preset rollover threshold; and determining that the vehicle has a risk of rollover if the absolute value of the calculated lateral-load transfer rate is larger than the preset rollover threshold.

Optionally, the determining module is also used for: in the case where it is determined that the vehicle has a risk of rollover, categorizing the risk level according to the magnitude of the absolute value of the lateral-load transfer rate, where a greater absolute value of the lateral-load transfer rate indicates a higher risk of rollover.

Optionally, the device further comprises: a display device, a voice device and/or an instrument for providing rollover warning information, wherein the rollover warning information comprises the lateral-load transfer rate and/or the risk level; and/or an indicator lamp for indicating the risk level.

In yet another aspect of the invention, a vehicle is also provided, comprising the device according to any of the preceding paragraphs.

In yet another aspect of the invention, a vehicle is also provided, comprising a processor, a memory, and a computer program stored on the memory and executable on the processor, the processor implementing the steps of any of the above-described methods applicable to a server-side when executing the program.

In still another aspect of the present invention, a computer-readable storage medium is also provided, having a computer program stored thereon, the program performing the steps of any of the above-described methods applicable to a server side, a terminal, or a device side when executed by the processor.

According to the technical solution provided by the invention, the load transfer rate threshold model based on the centrifugal force rollover moment of the sprung mass can simulate the actual rollover state of a vehicle more truly, with a more accurate state indication effect and a high warning accuracy; moreover, the technical solution provided by the invention is suitable for vehicles with multiple axles, and can perform rollover warning for buses and tracks with multiple axles; and the optimal warning effect can be achieved for different vehicle types according to the customized critical value setting. According to the characteristics of the load transfer rate and the habits of the driver, various modes such as instrument indication and the like are utilized, so that the influence of the current driving operation on the rollover risk state can be visually shown, and thus the driver can be facilitated to correct the driving operation according to the risk state.

BRIEF DESCRIPTION OF THE DRAWINGS

The accompanying drawings, which are included to provide a further understanding of the invention and are incorporated in and constitute a part of this description, illustrate embodiments of the invention and description thereof to explain the invention and are not to be construed as limiting the invention. In the drawings.

DETAILED DESCRIPTION OF THE EMBODIMENTS

In order that the objects, features and advantages of the present invention will become more apparent, a more thorough and complete description of the present invention will be rendered with reference to specific embodiments as well as the accompanying drawings. It is to be understood that the described embodiments are only a few, but not all, embodiments of the invention. On the basis of the embodiments of the present invention, all other embodiments obtained by a person of ordinary skill in the art without involving any inventive effort are within the scope of the present invention.

It is to be noted that the terms "first", "second" and the like in the description and claims of the present invention and in the above-mentioned drawings are used for distinguishing between similar objects and not necessarily for describing a particular order or sequence. It is to be understood that the expressions so used are interchangeable under appropriate circumstances such that the embodiments of the invention described herein are capable of operating in sequences other than those illustrated or described herein. Furthermore, the terms "comprise", "include" and "have", as well as any variations thereof, are intended to indicate a non-exclusive inclusion, such that a process, method, system, article, or device that includes a list of steps or elements is not necessarily limited to those steps or elements expressly listed, but may include other steps or elements not expressly listed or inherent to such process, method, article, or device.

Figure 1:
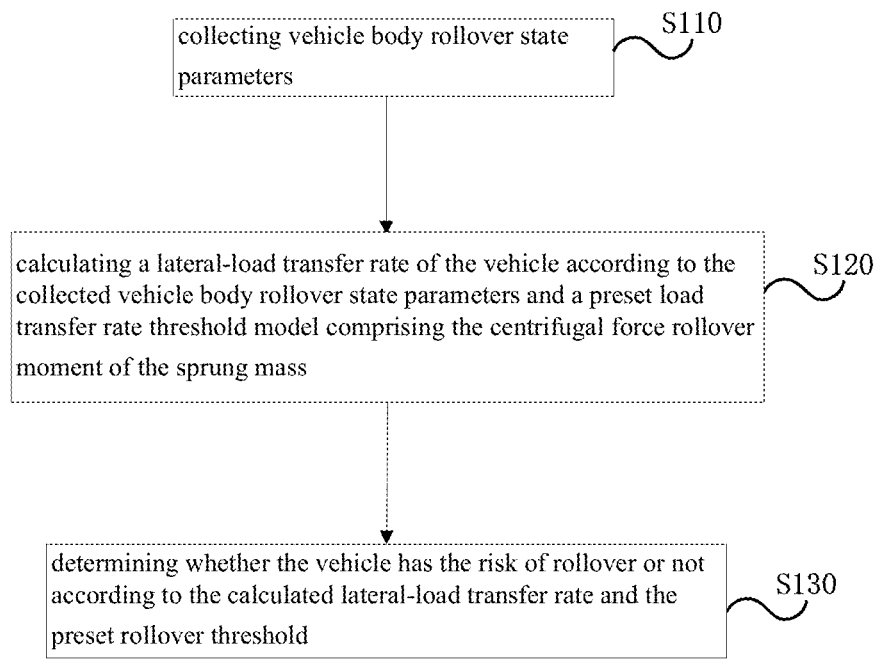
FIG. 1 is an overall frame view of the method for vehicle rollover prevention warning according to the present invention.
Figure 2:
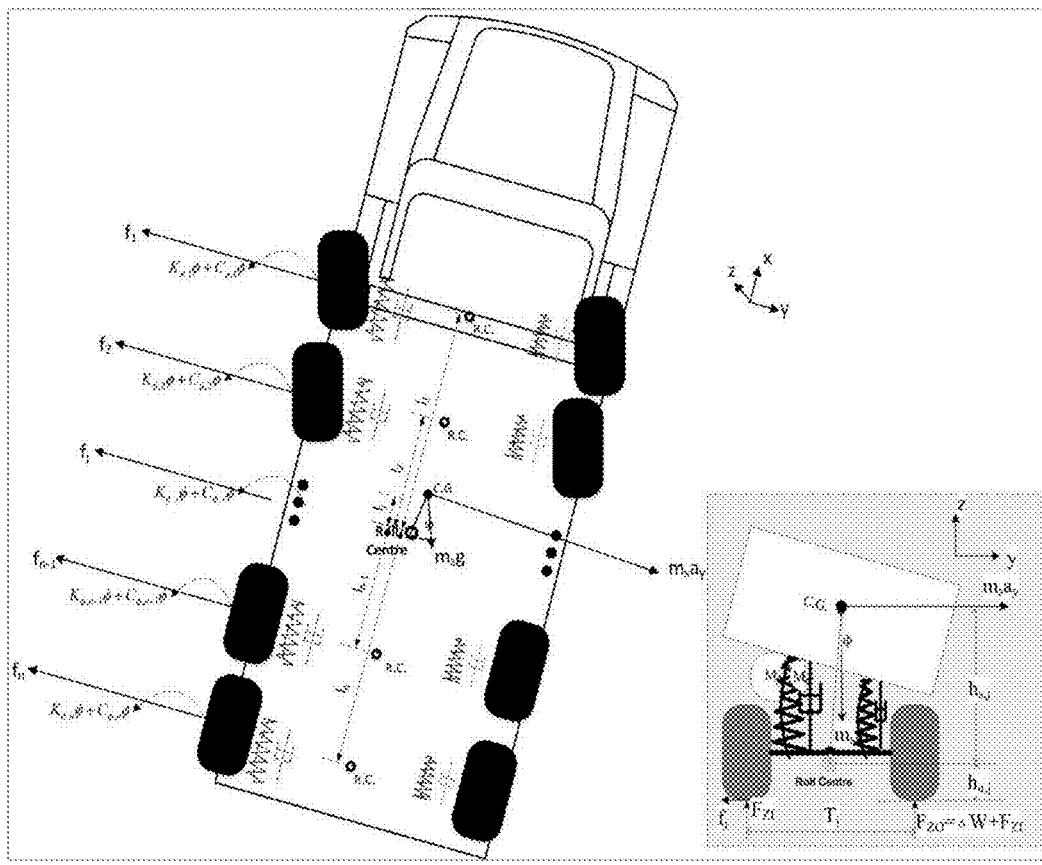
FIG. 2 is a schematic diagram of a multi-axle vehicle rollover dynamics model.

In one aspect, the invention provides a method for vehicle rollover prevention warning. FIG. 1 is an overall frame view of the method for vehicle rollover prevention warning according to the present invention; FIG. 2 is a schematic diagram of a multi-axle vehicle rollover dynamics model. As shown in FIGS. 1 and 2. The method for vehicle rollover prevention warning of the present invention includes: step S110, collecting vehicle body rollover state parameters; s120, calculating a lateral-load transfer rate of the vehicle according to the collected vehicle body rollover state parameters and a preset load transfer rate threshold model including a centrifugal force rollover moment of a sprung mass; and S130, determining whether the vehicle has a risk of rollover or not according to the calculated lateral-load transfer rate and the preset rollover threshold. The load transfer rate threshold model considers the balance effect of the centrifugal force rollover moment of the sprung mass in the rollover critical state, so that the model can simulate the actual rollover critical state more truly.

"Sprung mass" and "unsprung mass" have a very important influence on the safety and comfort of automobiles. The mass carried by the elastic element (including a spring and a damping cylinder) is referred to as the "sprung mass", and mainly includes the mass carried by a chassis frame and all other elastic components. The mass carried by the components extending from a suspension swing arm or the elastic elements to a wheel end is classified as "unsprung mass". In brief, the components that can bounce with the wheels carry "unsprung mass", and the components that can only remain relatively stationary with the vehicle body carry "sprung mass". For example, for a vehicle with a non-independent suspension, the rear axle carries "unsprung mass" since the rear axle tilts as the wheels bounce.

According to the technical solution provided by the invention, the advantages and disadvantages of different load transfer rate indexes in indicating the rollover state are compared, the load transfer rate threshold model based on vehicle dynamics is selected, and improvement is made on this basis. The rollover state described in the existing vehicle rollover dynamics model does not simulate exactly the critical state, with still a rotational inertia about an X-axle as a balancing factor; according to the technical solution provided by the invention, the rollover moment caused by a lateral acceleration of the sprung mass of the vehicle is added into the balancing process, simulating the rollover critical state more truly. With the centrifugal force rollover moment of the sprung mass considered, the universal load transfer rate model provided by the invention can simulate the actual rollover state of a vehicle more truly than the existing model, and the state indication effect is more accurate.

According to one embodiment of the method for vehicle rollover prevention warning, the method further includes establishing the load transfer rate threshold model according to a lateral force relation and a rollover moment balance relation of the vehicle. The lateral force relation and the rollover moment balance relation are those of a multi-axle vehicle including more than two axles. Now that various rollover thresholds correspond to settings of two-axle vehicles, but according to the technical solution provided by the invention, the dynamics of multi-axle (including two-axle) vehicles are modeled, so that the rollover warning system is generally applicable to buses and trucks with various axle numbers.

According to the lateral force relation and the rollover moment balance relation, namely the horizontal force balance relation and the moment balance relation in a rollover limit state, there are the following formulas:

$$\left(\sum_{i=1}^{n} K_{\phi,i}\right)\phi + \left(\sum_{i=1}^{n} C_{\phi,i}\right)\dot{\phi} = m_s a_y h_s \cos\phi + m_s g h_s \sin\phi$$

$$f_j = m_s a_y / l_j \sum_{i=1}^{n} \frac{1}{l_i}, \quad \sum_{j=1}^{n} f_j = m_s a_y$$

when the roll angle is small, $$a_y = \frac{\left(\sum_{j=1}^{n} K_{\phi,j}\right)\phi + \left(\sum_{j=1}^{n} C_{\phi,j}\right)\dot{\phi} - m_s g h_s \phi}{m_s h_s} = \frac{k\phi + c\dot{\phi} - m_s g h_s \phi}{m_s h_s},$$

$$\begin{cases} k = \sum_{j=1}^{n} K_{\phi,j} \\ c = \sum_{j=1}^{n} C_{\phi,j} \end{cases}$$

and according to the moment balance and the definition of the load transfer rate, there is such a formula:

$$\Delta W_j = -\frac{2\left(K_{\phi,j}\phi + C_{\phi,j}\dot{\phi} + f_j h_u\right)}{T}$$

the lateral-load transfer rate of an n-axle vehicle is thus obtained as follows:

$$LTR_g = \frac{-2\sum_{j=1}^{n}\left(\frac{K_{\phi,j}\phi h_s + C_{\phi,j}\dot{\phi}h_s + \frac{h_{uj}}{l_j \sum_{i=1}^{n}\frac{1}{l_i}}(k\phi + c\dot{\phi} - m_s g h_s \phi)}{}\right)}{m_s g h_s T} \quad \text{(Formula 1)}$$

In the above formula, $LTR_g$ is the lateral-load transfer rate of an n-axle vehicle; n is the number of axles of the vehicle; $m_s$ is the sprung mass of the vehicle; $h_s$ is the vertical distance from the center of mass of the vehicle to the rollover axle; $h_u=h_{uj}$ is the distance from the rollover center of each axle to the ground; T is the wheel tread of each axle; $\phi$ is the rollover angle of the vehicle; $K_{\phi,j}$,k is the roll stiffness for each axle suspension and a combined roll stiffness; $C_{\phi,j}$,c is the damping coefficient for each axle suspension and a combined damping coefficient; $l_i$= (i=1, . . . , n) is the longitudinal distance of each axle from the center of mass; $f_i$=(i=1, . . . , n) is a lateral force balanced with a inertial force for each axle; $a_y$ is a lateral acceleration of the vehicle.

Formula 1 can accurately indicate the rollover risk of a multi-axle buses and trucks, but is too complex in practical use, when the number of axles is increased, the calculated amount is greatly increased, and the measurement of variables is also a heavy workload. Therefore, the model is simplified to a certain extent, when the sprung mass is far larger than the unsprung mass, namely $m_s \gg m_u$, and the rollover center of each axle is approximately equally distanced from the ground at $h_u=h_{ui}$, according to the D'Alembert's principle, the formula of the load transfer rate threshold model is simplified. The formula of the D'Alembert's principle is as follows:

$$\begin{cases} \sum M_{x,sprung} = k\phi + c\dot{\phi} - m_s a_y h_s \cos\phi - m_s g h_s \sin\phi \leq 0 \\ \sum M_{x,unsprung} = \Delta W_i \frac{T_i}{2} - F_i h_{ui} - K_{\phi,i}\phi - C_{\phi,i}\dot{\phi} \leq 0 \\ \sum F_y = \sum_{i=1}^{n} f_i - m_s a_y = 0 \end{cases}$$

wherein, $\Delta W_i$=(i=1, . . . , n), $\Delta W$ are the load transfer of each axle and the load transfer of the whole vehicle are respectively; $F_i$=(i=1, . . . , n) is tire lateral biasing force (lateral force) for each axle; M represents the moment, subscripts x and sprung represent the moment of the sprung mass about the X-axle, and subscripts x and unsprung represent the moment of the unsprung mass about the X-axle.

Furthermore, because of $h_u=h_{ui}$ and $\Sigma_{j=1}^{n} 1/(l_j \Sigma_{i=1}^{n}(1/l_i))$= 1, according to Formula 1, a simplified model formula can be obtained as follows:

$$LTR_g = -\frac{2\left(k(h_u + h_s) - m_s g h_s h_u\right)\phi + c(h_u + h_s)\dot{\phi}}{mgh_s T}, \quad \text{(Formula 2)}$$

wherein $m=m_s+m_u$; $m_u$ is the unsprung mass of the vehicle.

Multi-axle rollover dynamics model can be referenced schematically to FIG. 2, wherein the symbols indicate the same as in the above formula.

According to one embodiment of the method for vehicle rollover prevention warning of the present invention, the vehicle body rollover state parameters include a vehicle body roll angle and a roll angle rate. The load transfer rate threshold model provided by the technical solution of the invention requires some key parameters including the sprung mass, the unsprung mass, and the vertical distance from the center of mass from the rollover center, the distance from the rollover center to the ground, the wheel tread of the vehicle, the combined roll stiffness and the combined damping coefficient of the suspension; and variables including only the roll angle and the roll angle rate.

According to one embodiment of the method for vehicle rollover prevention warning, determining whether the vehicle has a risk of rollover according to the calculated lateral-load transfer rate and the preset rollover threshold includes: determining that the vehicle has no risk of rollover if the absolute value of the calculated lateral-load transfer rate is less than or equal to the preset rollover threshold; and determining that the vehicle has a risk of rollover if the absolute value of the calculated lateral-load transfer rate is larger than the preset rollover threshold. Comparing the currently calculated dynamic threshold with the preset rollover threshold of the vehicle, wherein the preset rollover threshold is generally smaller than 1, and a warning critical value ratio according to the vehicle to be matched can be set, for example, the preset rollover threshold is 50%.

Figure 3:
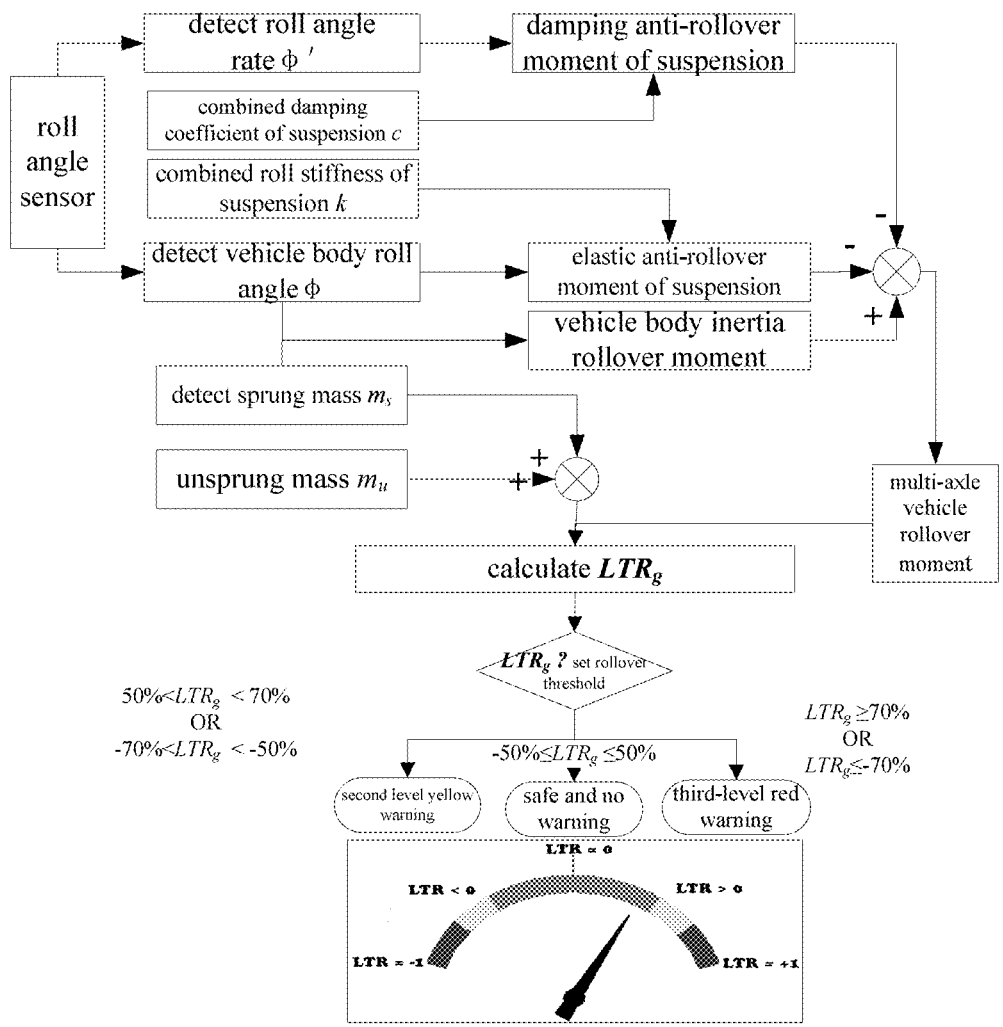
FIG. 3 is an algorithm flow diagram of a preferred embodiment of the method for vehicle rollover prevention warning provided by the present invention.

FIG. 3 is an algorithm flow diagram of a preferred embodiment of the method for vehicle rollover prevention warning provided by the present invention; as shown in FIG. 3, the algorithm flow of the rollover prevention warning system is designed on the basis of the rollover threshold model of a multi-axle vehicle. The algorithm flow includes: detecting in real time by a vehicle roll angle sensor to obtain a roll angle rate and a roll angle; calculating the anti-rollover moment of the suspension damping according to the combined damping coefficient of the vehicle suspension, calculating the elastic anti-rollover moment of the suspension according to the combined roll stiffness of the suspension, and calculating the inertia rollover moment of the vehicle body caused by the sprung mass; calculating the rollover moment of the multi-axle vehicle according to the above moment value; calculating to obtain LTRg according to the rollover moment, the sprung mass and the unsprung mass of the multi-axle vehicle and a general load transfer rate model according to Formula 2; comparing the currently calculated dynamic threshold with the set rollover threshold of the vehicle (generally the set rollover threshold is smaller than 1), and setting a warning threshold ratio according to the vehicle to be matched, wherein the thresholds 50% and 70% shown in FIG. 3 are exemplary set thresholds; and finally setting a warning display, where it can be known, according to the definition of the load transfer rate, that when the steering wheel turns right, the vehicle load is transferred to the left side, the indicator of the LTRg points to the right side, and more violent operation brings higher risks of rollover, the driver is visually warned of dangers and then corrects his operation, so as to avoid rollover accidents In the above calculations, the rollover moment of the multi-axle vehicle is a resultant moment, which is transferred from the sprung mass moment balance to the unsprung mass moment balance, and is finally obtained according to the force and the moment relations, the definition of the load transfer rate LTR, namely LTR=ΔW/W (ΔW embodied in the unsprung moment balance formula), and the total load W (i.e., $m_s+m_u$). In the above formula, $$\Delta W_i \frac{T_i}{2}$$

is load transfer moment balance, the load transfer ΔW is obtained, and then LTR=ΔW/W is obtained; $m_s a_y h_s \cos \phi$ is the centrifugal rollover moment of the sprung mass; the vehicle body inertia rollover moment is $m_s a_y h_s \cos \phi + m_s g h_s \sin \phi$; the damping anti-rollover moment of the suspension is $c\dot\phi$; the elastic anti-rollover moment of the suspension is $k\phi$; the total multi-axle rollover moment is obtained by subtracting the damping anti-rollover moment of the suspension from the inertia rollover moment of the vehicle body, and then subtracting the elastic anti-rollover moment of the suspension.

The method for vehicle for rollover prevention warning based on the vehicle dynamic model is only sensitive to the suspension roll stiffness, the damping coefficient, the roll angle and the roll angle rate of the vehicle, and can dynamically indicate the rollover risk state of the vehicle in real time.

According to one embodiment of the method for vehicle rollover prevention warning, in the case where it is determined that the vehicle has a risk of rollover, the risk level is categorized according to the magnitude of the absolute value of the lateral-load transfer rate, where a greater absolute value of the lateral-load transfer rate indicates a higher risk of rollover. As shown in FIG. 3, the rollover risk state in the instrument indication is classified into three types: safe, second-level yellow warning and third-level red warning. The safe state is indicated when $-50\% \leq LTR_g \leq 50\%$; the second-level yellow warning state is indicated when $50\% < LTR_g < 70\%$ or $-70\% < LTR_g < -50\%$; the third-level red warning is indicated when $LTR_g \geq 70\%$ or $LTR_g \leq -70\%$. A higher risk level indicates a greater likelihood of rollover. The critical value of the warning can be customized according to different vehicle types, the lower critical value can be set correspondingly for the vehicle with the higher center of mass and the lower intrinsic rollover threshold when matching the vehicle, thereby satisfying the safety requirements of different vehicle types.

According to the embodiment of the method for vehicle rollover prevention warning, the method further includes: providing the rollover warning information by displaying through a display device, broadcasting through a voice device and/or indicating through an instrument, wherein the rollover warning information includes the lateral-load transfer rate and/or the risk level; and/or the risk level is indicated by an indicator lamp. By means of instrument indication, the rollover state of the vehicle disclosed by the model is indicated, which caters to the visual feeling of a driver; when the steering wheel turns left, the vehicle tends to roll over towards right, LTR<0, the rollover risk state indicator points to the left side, with the indicated value positively correlated with the amplitude of rollover tendency; and vise versa, when the steering wheel turns right, the risk of vehicle rollover is as likely as indicated by the indicator.

Figure 4:
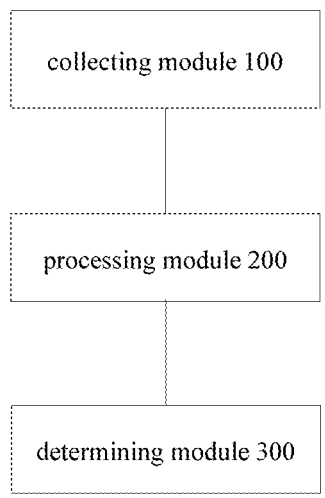
FIG. 4 is an overall frame view of the device for vehicle rollover prevention warning according to the present invention.

In another aspect of the present invention, a device for vehicle rollover prevention warning is provided. FIG. 4 is an overall frame view of the device for vehicle rollover prevention warning according to the present invention. As shown in FIG. 4, the device for vehicle rollover prevention warning of the present invention includes: a collecting module 100 for acquiring vehicle body rollover state parameters; a processing module 200 for calculating a lateral-load transfer rate of the vehicle according to the collected vehicle body rollover state parameters and a preset load transfer rate threshold model including a centrifugal force rollover moment of a sprung mass; and a determining module 300 for determining whether the vehicle has a risk of rollover or not according to the calculated lateral-load transfer rate and the preset rollover threshold.

According to one embodiment of the rollover prevention warning device of the vehicle of the present invention, the vehicle body rollover state parameters include a vehicle body roll angle and a roll angle rate.

According to one embodiment of the device for vehicle rollover prevention warning, the device further includes: the load transfer rate threshold model being established according to a lateral force relation and a rollover moment balance relation of the vehicle.

According to one embodiment of the device for vehicle rollover prevention warning, the device further includes: the lateral force relation and the rollover moment balance relation being those of a multi-axle vehicle including more than two axles.

According to one embodiment of the device for vehicle rollover prevention warning, the model formula of the load transfer rate threshold model is as follows:

$$LTR_g = \frac{-2 \sum_{j=1}^{n} \left( K_{\phi,j} \phi h_s + C_{\phi,j} \dot\phi h_s + \frac{h_{u,j}}{l_j \sum_{i=1}^{n} \frac{1}{l_i}} (k\phi + c\dot\phi - m_s g h_s \phi) \right)}{m_s g h_s T},$$

wherein $LTR_g$ is the lateral-load transfer rate of an n-axle vehicle; n is the number of axles of the vehicle; $m_s$ is the sprung mass of the vehicle; $h_s$ is the vertical distance from the center of mass of the vehicle to the rollover axle; $h_u = h_{u,j}$ is the distance from the rollover center of each axle to the ground; T is the wheel tread of each axle; $\phi$ is the rollover angle of the vehicle; $K_{\phi,j}, k$ is the roll stiffness for each axle suspension and a combined roll stiffness; $C_{\phi,j}, c$ is the damping coefficient for each axle suspension and a combined damping coefficient; $l_i (i=1, \ldots, n)$ is the longitudinal distance of each axle from the center of mass.

According to one embodiment of the device for vehicle rollover prevention warning, the device further includes: a simplified form of the model formula of the load transfer rate threshold model according to the D'Alembert's principle as follows:

$$LTR_g = -\frac{2\left((k(h_u + h_s) - m_s g h_s h_u)\phi + c(h_u + h_s)\dot\phi\right)}{mgh_s T},$$

under the condition that the magnitude relation between the sprung mass $m_s$ and the unsprung mass $m_u$ of the vehicle is $m_s \gg m_u$, and the rollover centers of all the axles are the same distanced from the ground, wherein $m = m_s + m_u$; $m_u$ is the unsprung mass of the vehicle.

According to one embodiment of the device for vehicle rollover prevention warning, the determining module 300 is also used for: determining that the vehicle has no risk of rollover if the absolute value of the calculated lateral-load transfer rate is less than or equal to the preset rollover threshold; and determining that the vehicle has a risk of rollover if the absolute value of the calculated lateral-load transfer rate is larger than the preset rollover threshold.

According to one embodiment of the device for vehicle rollover prevention warning, the determining module 300 is also used for: in the case where it is determined that the vehicle has a risk of rollover, categorizing the risk level according to the magnitude of the absolute value of the lateral-load transfer rate, where a greater absolute value of the lateral-load transfer rate indicates a higher risk of rollover.

According to one embodiment of the device for vehicle rollover prevention warning, the device further includes: a display device, a voice device and/or an instrument for providing rollover warning information, wherein the rollover warning information includes the lateral-load transfer rate and/or the risk level; and/or an indicator lamp for indicating the risk level.

Figure 5:
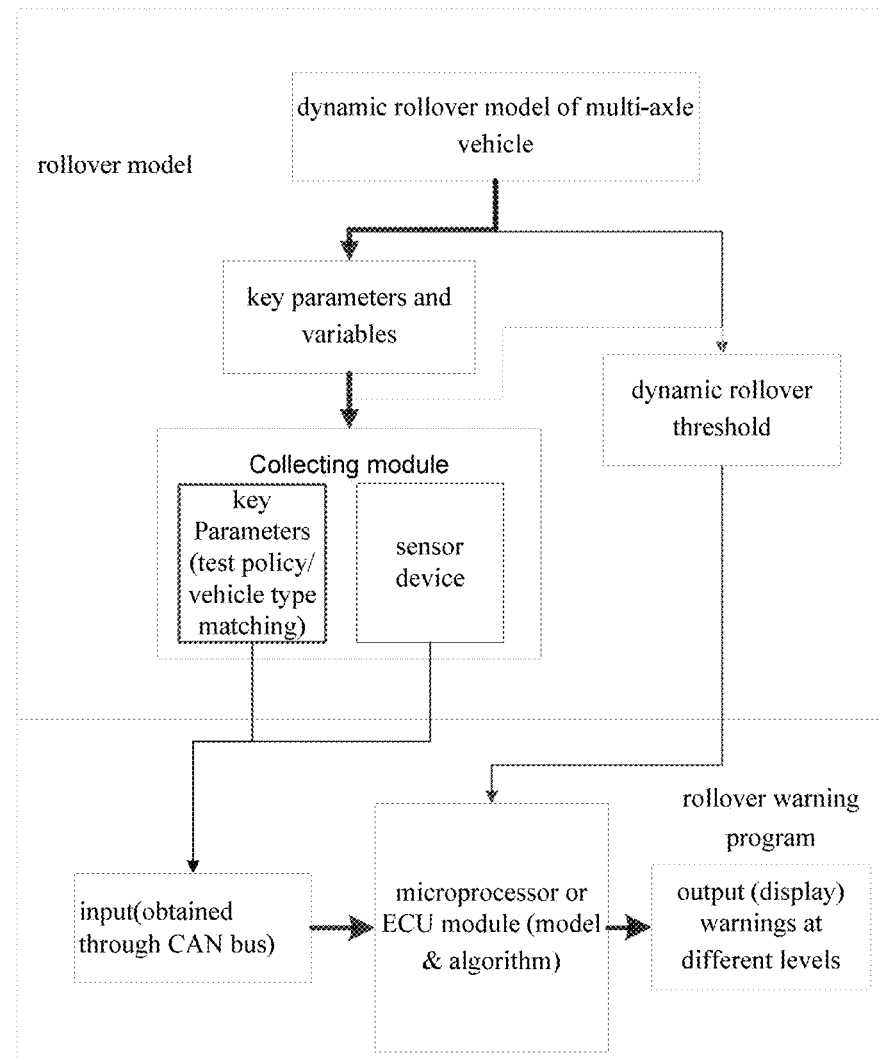
FIG. 5 is a functional block diagram of a preferred embodiment of the device for vehicle rollover prevention warning according to the present invention.

FIG. 5 is a functional block diagram of a preferred embodiment of the device for vehicle rollover prevention warning according to the present invention. As shown in FIG. 5, the device for vehicle rollover prevention warning provided by the invention includes two parts, a basic rollover model part and an actual rollover warning program part. The rollover model requires some key parameters including the sprung mass, the unsprung mass, and the vertical distance from the center of mass from the rollover center, the distance from the rollover center to the ground, the wheel tread of the vehicle, the combined roll stiffness and the combined damping coefficient of the suspension; and variables including only the roll angle and the roll angle rate. The key parameters need to be determined on the basis of the factory parameters of the vehicle and the actual operating conditions, the parameters related to the suspension need to be subjected to specific tests for matching, and the variables can be obtained through sensors. Sensor data is transmitted to a calculation module of a rollover warning system, such as an ECU (Electronic Control Unit) module, through a vehicle-mounted CAN bus network, a rollover risk state of the vehicle is dynamically indicated in real time finally according to a dynamic rollover threshold through the calculation flow and the algorithm shown in FIG. 3. The dynamic rollover threshold is set practically according to different vehicle types and specific circumstances. In general, the dynamic rollover threshold ranges from −1 to +1, and the risk level can be set according to different vehicle types, such as ±0.5 for a big type and ±0.6 for a small one; in extreme dangerous situations, the risk level can be set as ±0.7 for a big type and ±0.8 for a small one, and so on. And then the current load transfer rate calculated in real time is compared with the set dynamic rollover threshold.

In summary, in the invention, the vehicle body dynamics model is utilized to change the load transfer problem into the force and moment balance problem, the balance of the rollover moment and the anti-rollover moment; and according to the rollover warning algorithm based on the general threshold of the rollover dynamics of the multi-axle vehicle as shown in FIG. 3, detection, determination and warning in real time can be done through the setting of the parameters of the vehicle body. A specific implementation can be realized according to the actual situation with reference to the structural schematic diagram of FIG. 5, and the setting of the rollover threshold depends on different vehicle types and circumstances. Moreover, the CAN (Controller Area Network) bus network is used for sharing data and displaying or warning as an independent module or embedded into an existing bus network. The warning mode can also be correspondingly set according to different levels on the basis of the magnitude of the numerical value, so that the driver can be visually warned of the risk of vehicle rollover.

In the embodiment, the sensors can be an integrated vehicle sharing data embodiment or a separate sensor device; the microprocessor can be a microcomputer center, a microprocessor, an MCU (Microcontroller Unit) and the like; the display unit may also have an audible reminder function, or an indicator lamp can be used, not limited to a visual reminder only.

In yet another aspect of the invention, a vehicle is also provided, including the device according to any of the preceding paragraphs.

In yet another aspect of the invention, a vehicle is also provided, including a processor, a memory, and a computer program stored on the memory and executable on the processor, the processor implementing the steps of any of the above-described methods applicable to a server-side when executing the program.

In still another aspect of the present invention, a computer-readable storage medium is also provided, having a computer program stored thereon, the program performing the steps of any of the above-described methods applicable to a server side, a terminal, or a device side when executed by the processor.

According to the technical solution provided by the invention, the load transfer rate threshold model based on the centrifugal force rollover moment of the sprung mass can simulate the actual rollover state of a vehicle more truly, with a more accurate state indication effect and a high warning accuracy; moreover, the technical solution provided by the invention is suitable for vehicles with multiple axles, and can perform rollover warning for buses and tracks with multiple axles; and the optimal warning effect can be achieved for different vehicle types according to the customized critical value setting. According to the characteristics of the load transfer rate and the habits of the driver, various modes such as instrument indication and the like are utilized, so that the influence of the current driving operation on the rollover risk state can be visually shown, and thus the driver can be facilitated to correct the driving operation according to the risk state.

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope and spirit of the invention and the appended claims. For example, due to the nature of software, the functions described above may be implemented using software executed by a processor, hardware, firmware, hardwired, or a combination thereof. Furthermore, the functional units may be in the form of being integrated in one processing unit, separate physically, or having two or more units thereof integrated in one unit.

In the embodiments provided herein, it should be understood that the disclosed techniques may be implemented otherwise. Where the device embodiments described above are merely illustrative, foe r example, the division of elements may be one logical function division, there may be additional divisions in actual implementation, for example, multiple elements or components may be combined or integrated into another system, or some features may be omitted or not performed. In addition, the couplings or direct couplings or communicative connections shown or discussed with respect to one another may be indirect couplings or communicative connections through some interface, unit or module, and may be electrical or otherwise.

The elements described as separate elements may or may not be physically separate, and the elements described as control means may or may not be physical elements, either located in one place, or distributed over a plurality of elements. Some or all of the elements may be selected to achieve the object of the invention according to practical requirements. For the device embodiment, which correspond substantially to the method embodiments, the description thereof is relatively simple and reference to some portions of the description of the method embodiments can be taken.

The integrated unit, if implemented in the form of a software functional unit and sold or used as a stand-alone product, may be stored in a computer-readable storage medium. On the basis of this understanding, the technical solution may have, in nature or in part, contributive portions to the prior art, or entirety or portions thereof, embodied as a software product stored in a storage medium and including instructions for causing a computer device (may be a personal computer, server or network device, etc.) to perform all or part of the steps of the methods of the various embodiments of the present invention. The aforementioned storage medium includes: U disk, ROM, RAM, removable hard disk, magnetic or optical disk and various other media on which program code may be stored.

While the invention has been particularly shown and described with reference to preferred embodiments thereof, it is to be understood that those skilled in the art can make various changes and modifications to the present invention. It is intended that any modifications, variations and equivalents made without departing the spirit and scope of the invention shall fall within the scope of the appended claims.

The invention claimed is:

1. A method for determination of a rollover risk state of a vehicle, comprising:
   collecting vehicle body rollover state parameters;
   calculating a lateral-load transfer rate of the vehicle according to the vehicle body rollover state parameters and a preset load transfer rate threshold model, the preset load transfer rate threshold model comprising a centrifugal force rollover moment of a sprung mass of the vehicle the number of axles of the vehicle, a roll stiffness of axle suspensions of the vehicle, and a damping coefficient of axle suspensions of the vehicle; and
   determining a risk of rollover of the vehicle according to the calculated lateral-load transfer rate and a preset rollover threshold;
   wherein the roll stiffness of axle suspensions of the vehicle includes a roll stiffness for each axle suspension of the vehicle and a combined roll stiffness; and
   wherein the damping coefficient of axle suspensions of the vehicle includes a damping coefficient for each axle suspension of the vehicle and a combined damping coefficient;
   wherein the preset load transfer rate threshold model is established according to a lateral force balance relation and a rollover moment balance relation of the vehicle; and wherein a formula of the load transfer rate threshold model is as follows:

$$LTR_g = \frac{-2\sum_{j=1}^{n}\left(K_{\phi,j}\phi h_s + C_{\phi,j}\dot\phi h_s + \frac{h_{u,j}}{l_j\sum_{i=1}^{n}\frac{1}{l_i}}\left(k\phi + c\dot\phi - m_s g h_s \phi\right)\right)}{m_s g h_s T},$$

wherein $LTR_g$ is the lateral-load transfer rate of an n-axle vehicle; n is the number of axles of the vehicle; $m_s$ is the sprung mass of the vehicle; $h_s$ is a vertical distance from the center of mass of the vehicle to a rollover axle; $h_u = h_{uj}$ is a distance from a rollover center of each axle to the ground; T is a wheel tread of each axle; $\phi$ is the rollover angle of the vehicle; $K_{\phi,j}, k$ is a roll stiffness of each axle suspension and a combined roll stiffness of the vehicle; $C_{\phi,j}, c$ is a damping coefficient of each axle suspension and a combined damping coefficient of the vehicle; $l_i = (i=1, \ldots, n)$ is the longitudinal distance of each axle from the center of mass of the vehicle.

2. The method according to claim 1, wherein the vehicle body rollover state parameters comprise a vehicle body roll angle and a roll angle rate.

3. The method according to claim 1, further comprising: the lateral force balance relation and the rollover moment balance relation being those of a multi-axle vehicle comprising more than two axles.

4. The method according to claim 1, wherein the formula of the load transfer rate threshold model is simplified according to D'Alembert's principle as follows:

$$LTR_g = -\frac{2\left((k(h_u + h_s) - m_s g h_s h_u)\phi + c(h_u + h_s)\dot\phi\right)}{mgh_s T},$$

wherein $m = m_s + m_u$; and wherein $m_u$ is an unsprung mass of the vehicle.

5. The method according to claim 1, wherein the step of determining a risk of rollover of the vehicle comprises:
   determining that the risk of rollover of the vehicle does not exist when the absolute value of the calculated lateral-load transfer rate is less than or equal to the preset rollover threshold; and
   determining that the risk of rollover of the vehicle exists when the absolute value of the calculated lateral-load transfer rate is larger than the preset rollover threshold.

6. The method according to claim 5, wherein in the case where it is determined that the risk of rollover of the vehicle exists, a risk level is categorized according to the magnitude of the absolute value of the lateral-load transfer rate, wherein the absolute value of the lateral-load transfer rate positively correlates with the risk of rollover.

7. The method according to claim 6, further comprising:
   providing rollover warning information by displaying through a display device, broadcasting through a voice device and/or indicating through an instrument, wherein the rollover warning information comprises the lateral-load transfer rate and/or the risk level; and/or,
   the risk level is indicated by an indicator lamp.

8. A device for determination of a risk rollover state of a vehicle, comprising:
- a collecting module configured to acquire vehicle body rollover state parameters;
- a processing module configured to calculate a lateral-load transfer rate of the vehicle according to the collected vehicle body rollover state parameters and a preset load transfer rate threshold model, the preset load transfer rate threshold model comprising a centrifugal force rollover moment of a sprung mass of the vehicle, the number of axles of the vehicle, a roll stiffness of axle suspensions of the vehicle, and a damping coefficient of axle suspensions of the vehicle; and
- a determining module configured to determine a risk of rollover of the vehicle according to the calculated lateral-load transfer rate and a preset rollover threshold;
- wherein the roll stiffness of axle suspensions of the vehicle includes a roll stiffness for each axle suspension of the vehicle and a combined roll stiffness; and
- wherein the damping coefficient of axle suspensions of the vehicle includes a damping coefficient for each axle suspension of the vehicle and a combined damping coefficient;
- wherein the preset load transfer rate threshold model is established according to a lateral force balance relation and a rollover moment balance relation of the vehicle; and wherein a formula of the load transfer rate threshold model is as follows:

$$LTR_g = \frac{-2\sum_{j=1}^{n}\left(K_{\phi,j}\phi h_s + C_{\phi,j}\dot{\phi} h_s + \frac{h_{uj}}{l_j\sum_{i=1}^{n}\frac{1}{l_i}}(k\phi + c\dot{\phi} - m_s g h_s \phi)\right)}{m_s g h_s T},$$

wherein $LTR_g$ is the lateral-load transfer rate of an n-axle vehicle; n is the number of axles of the vehicle; $m_s$ is the sprung mass of the vehicle; $h_s$ is a vertical distance from the center of mass of the vehicle to a rollover axle; $h_u = h_{uj}$ is a distance from a rollover center of each axle to the ground; T is a wheel tread of each axle; $\phi$ is the rollover angle of the vehicle; $K_{\phi,j}, k$ is a roll stiffness of each axle suspension and a combined roll stiffness of the vehicle; $C_{\phi,j}, c$ is a damping coefficient of each axle suspension and a combined damping coefficient of the vehicle; $l_i = (i=1, \ldots, n)$ is the longitudinal distance of each axle from the center of mass of the vehicle.

9. The device according to claim 8, wherein the vehicle body rollover state parameters include a vehicle body roll angle and a roll angle rate.

10. The device according to claim 8, further comprising: the lateral force balance relation and the rollover moment balance relation being those of a multi-axle vehicle comprising more than two axles.

11. The device according to claim 8, wherein the formula of the load transfer rate threshold model is simplified according to D'Alembert's principle as follows:

$$LTR_g = -\frac{2((k(h_u + h_s) - m_s g h_s h_u)\phi + c(h_u + h_s)\dot{\phi})}{mgh_s T},$$

wherein $m = m_s = m_u$; and wherein $m_u$ is an unsprung mass of the vehicle.

12. The device according to claim 8, wherein the determining module is further configured to determine:
- that the risk of rollover of the vehicle does not exist when the absolute value of the calculated lateral-load transfer rate is less than or equal to the preset rollover threshold; and
- that the risk of rollover the vehicle exists when the absolute value of the calculated lateral-load transfer rate is larger than the preset rollover threshold.

13. The device according to claim 12, wherein, in the case where it is determined that the risk of rollover of the vehicle exists, the determining module is further configured to categorize a risk level according to the magnitude of the absolute value of the lateral-load transfer rate, wherein the absolute value of the lateral-load transfer rate positively correlates with the risk of rollover.

14. The device according to claim 13, further comprising:
- a display device, a voice device and/or an instrument for providing rollover warning information, wherein the rollover warning information comprises the lateral-load transfer rate and/or the risk level; and/or,
- an indicator lamp for indicating the risk level.

15. A non-transitory computer-readable storage medium, having a computer program stored thereon, the program, when executed by a processor causes the processor to perform the steps of a method for determination of a risk rollover state of a vehicle, the method comprising:
- collecting vehicle body rollover state parameters;
- calculating a lateral-load transfer rate of the vehicle according to the vehicle body rollover state parameters and a preset load transfer rate threshold model, the preset load transfer rate threshold model comprising a centrifugal force rollover moment of a sprung mass of the vehicle the number of axles of the vehicle, a roll stiffness of axle suspensions of the vehicle, and a damping coefficient of axle suspensions of the vehicles; and
- determining a risk of rollover of the vehicle according to the calculated lateral-load transfer rate and a preset rollover threshold;
- wherein the roll stiffness of axle suspensions of the vehicle includes a roll stiffness for each axle suspension of the vehicle and a combined roll stiffness; and
- wherein the damping coefficient of axle suspensions of the vehicle includes a damping coefficient for each axle suspension of the vehicle and a combined damping coefficient;
- wherein the preset load transfer rate threshold model is established according to a lateral force balance relation and a rollover moment balance relation of the vehicle; and wherein a formula of the load transfer rate threshold model is as follows:

$$LTR_g = \frac{-2\sum_{j=1}^{n}\left(K_{\phi,j}\phi h_s + C_{\phi,j}\dot{\phi} h_s + \frac{h_{uj}}{l_j\sum_{i=1}^{n}\frac{1}{l_i}}(k\phi + c\dot{\phi} - m_s g h_s \phi)\right)}{m_s g h_s T},$$

wherein $LTR_g$ is the lateral-load transfer rate of an n-axle vehicle; n is the number of axles of the vehicle; $m_s$ is the sprung mass of the vehicle; $h_s$ is a vertical distance from the center of mass of the vehicle to a rollover axle; $h_u = h_{uj}$ is a distance from a rollover center of each axle to the ground; T is a wheel tread of each axle; $\phi$ is the rollover angle of the vehicle; $K_{\phi,i}, k$ is a roll stiffness of each axle suspension and a combined roll stiffness of the vehicle; $C_{\phi,i}, c$ is a damping coefficient of each axle suspension and a combined damping coefficient of the vehicle; $l_i=(i=1,\ldots,n)$ is the longitudinal distance of each axle from the center of mass of the vehicle.

\* \* \* \* \*